US012746465B2

(12) United States Patent
Odoriba et al.

(10) Patent No.: US 12,746,465 B2
(45) Date of Patent: Sep. 29, 2026

(54) PROGRAM, METHOD, AND INFORMATION PROCESSING DEVICE FOR GAME

(71) Applicant: CYGAMES, INC., Tokyo (JP)

(72) Inventors: Eisuke Odoriba, Tokyo (JP); Shigeki Fujimoto, Tokyo (JP); Keisuke Mase, Tokyo (JP); Yoshiro Takagi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 300 days.

(21) Appl. No.: 18/432,992

(22) Filed: Feb. 5, 2024

(65) Prior Publication Data

US 2024/0173619 A1 May 30, 2024

Related U.S. Application Data

(63) Continuation of application No. PCT/JP2022/030124, filed on Aug. 5, 2022.

(30) Foreign Application Priority Data

Aug. 6, 2021 (JP) ................................ 2021-130052

(51) Int. Cl.

| | |
|---|---|
| ***A63F 13/422*** | (2014.01) |
| ***A63F 13/35*** | (2014.01) |
| ***A63F 13/5375*** | (2014.01) |
| ***A63F 13/79*** | (2014.01) |
| ***A63F 13/822*** | (2014.01) |

(52) U.S. Cl.

CPC ........ *A63F 13/422* (2014.09); *A63F 13/5375* (2014.09); *A63F 13/822* (2014.09); *A63F 13/35* (2014.09); *A63F 13/79* (2014.09)

(58) Field of Classification Search

CPC .. A63F 13/422; A63F 13/5375; A63F 13/822; A63F 13/35; A63F 13/79; A63F 13/69; A63F 13/45; A63F 13/533; A63F 13/80

See application file for complete search history.

(56) References Cited

FOREIGN PATENT DOCUMENTS

JP 4177401 11/2008

OTHER PUBLICATIONS

International Search Report issued in PCT/JP2022/030124 on Sep. 6, 2022 (6 pages).

(Continued)

*Primary Examiner* — Kevin Y Kim

(74) *Attorney, Agent, or Firm* — Osha Bergman Watanabe & Burton LLP

(57) ABSTRACT

Provided is a program for a game for performing a battle by using a game-medium set selected from among two or more game-medium sets, the game-medium set being organized and stored before the start of the battle and including game media selected from among game media possessed by a user, the program causing a computer to execute steps: for storing, when a selection input for selecting a quick-execution game medium from among the game media included in the game-medium set is accepted, the selected game medium as a quick-execution game medium in the game-medium set; for displaying a quick-execution operation section in a battle screen when the battle is started by using the game-medium set; and for executing effect activation processing associated with the quick-execution game medium in the game-medium set, when a user operation with respect to the quick-execution operation section is accepted.

7 Claims, 9 Drawing Sheets

(56) References Cited

OTHER PUBLICATIONS

Written Opinion of the International Searching Authority issued in PCT/JP2022/030124 on Sep. 6, 2022 (5 pages).
Office Action issued in the counterpart Japanese Patent Application No. 2021-130052, mailed on Feb. 2, 2022 (10 pages).
Chocobo's Mysterious Dungeon Everybody! System Explanation and Impressions, Gamer Japanese teacher [online], Apr. 29, 2020, https://j1gamers.com/chocobos-mystery-dungeon-every-buddy/ (33 pages).
Chocobo's Mysterious Dungeon: Everybody! Rating, Review. It's been a while since I've played a "Mystery Dungeon" game! It's a good game that deserves to be overshadowed by the bigger titles., mtg60.com [online], Mar. 20, 2019, https://mtg60.com/archives/chokobo-everybody-review.html (35 pages).
[Toram Online] How to create shortcuts [Beginner], TORUM Online Strategy & Communication Site [online], Dec. 4, 2015, https://www.dopr.net/toramonline/kihon5 (16 pages).
[SAOIF] Which weapon is good? (Article for beginners) Sword Art Online Integral Factor, Mochiyuki's SAOIF Strategy etc. [online], Dec. 6, 2020, [searched on Aug. 20, 2025], <https://yukiyukiki3939.hateblo.jp/entry/2020/12/06/114227> (26 pages).

PROGRAM, METHOD, AND INFORMATION PROCESSING DEVICE FOR GAME

TECHNICAL FIELD

The present invention relates to a program etc. for a game and particularly relates to a program etc. for a game for performing a battle by using a game-medium set selected from among two or more game-medium sets, the program etc. being for a game for enabling a battle using a quick-execution game-medium operation section.

BACKGROUND ART

Among games played by using information processing devices such as computers and smartphones, a number of games have been released, in which an effect executable by a player is activated during a battle with an enemy, whereby the player can advantageously proceed with the game. For such games, there is a known game program in which one ability selected from among a plurality of abilities of a player character PC is assigned to a player operation button serving as a shortcut button, and, when the operation button is pressed, the assigned ability can be quickly executed (Patent Literature 1).

CITATION LIST

Patent Literature

[PTL 1] Publication of Japanese Patent No. 4177401

SUMMARY OF INVENTION

Technical Problem

There is a known game in which game-medium sets that each include game media selected from among game media possessed by the player are organized and in which a game-medium set selected from among the plurality of organized game-medium sets is used to perform a battle. In such a game, since the game-medium set to be used in a battle is selected from among the plurality of game-medium sets, even if a shortcut button is set for one ability selected from the abilities of the player character PC, it is not always the case that the ability assigned to the shortcut button can be used in the game-medium set used in the battle.

The present invention has been made in order to solve the above-described problem, and a main object thereof is to provide a program etc. for enabling, in a game for performing a battle using a game-medium set selected from among two or more game-medium sets, the battle using a quick-execution game-medium operation section.

Solution to Problem

1. In order to achieve the above-described object, according to one aspect, the present invention provides a program for a game for performing a battle by using a game-medium set selected from among two or more game-medium sets, the game-medium set being organized and stored before the start of the battle and including game media selected from among game media possessed by a user, the program causing a computer to execute: a step for storing, at the time of organization of the game-medium set, when a selection input for selecting a quick-execution game medium from among the game media included in the game-medium set is accepted, the selected game medium as a quick-execution game medium in the game-medium set; a step for displaying a quick-execution operation section in a battle screen when the battle is started by using the game-medium set; and a step for executing effect activation processing associated with the quick-execution game medium in the game-medium set, when a user operation with respect to the quick-execution operation section is accepted.

2. Furthermore, in the program according to Item 1, it is also possible to further cause the computer to execute: a step for displaying a non-quick-execution operation section in the battle screen; a step for displaying an effect-activation game-medium selection screen for selecting any of the game media included in the game-medium set, when a user operation with respect to the non-quick-execution operation section is accepted; and a step for executing, when a user operation for selecting any of the game media is accepted in the effect-activation game-medium selection screen, effect activation processing associated with the selected game medium.

3. Furthermore, in the program according to Item 2, game-medium selection sections for selecting the individual game media may be displayed in the effect-activation game-medium selection screen, and, in the game-medium selection section for the quick-execution game medium, information indicating that the game medium associated with the game-medium selection section has been set as a quick-execution game medium may be displayed.

4. Furthermore, in the program according to one of Items 1 to 3, a basic operation section may be displayed in the battle screen, and it is also possible to further cause the computer to execute: a step for determining whether the quick-execution game medium has been set in the game-medium set used in the battle; and a step for displaying the quick-execution operation section instead of the basic operation section, in the case where it is determined that the quick-execution game medium has been set.

5. Furthermore, in the program according to one of Items 1 to 4, the game media may include a first-type game medium and a second-type game medium; two or more pieces of skill activation processing may be associated with the first-type game medium, and one piece of effect activation processing may be associated with the second-type game medium; two or more first-type game media and two or more second-type game media may be included in the game-medium set; and the quick-execution game medium may be selected from among the second-type game media.

6. According to one aspect, the present invention provides a method for a game for performing a battle by using a game-medium set selected from among two or more game-medium sets, the game-medium set being organized and stored before the start of the battle and including game media selected from among game media possessed by a user, the method causing a computer to execute: a step for storing, at the time of organization of the game-medium set, when a selection input for selecting a quick-execution game medium from among the game media included in the game-medium set is accepted, the selected game medium as a quick-execution game medium in the game-medium set; a step for displaying a quick-execution operation section in a battle screen when the battle is started by using the game-medium set; and a step for executing effect activation processing associated with the quick-execution game medium in the game-medium set, when a user operation with respect to the quick-execution operation section is accepted.

7. According to one aspect, the present invention provides an information processing device for a game for performing a battle by using a game-medium set selected from among two or more game-medium sets, the game-medium set being organized and stored before the start of the battle and including game media selected from among game media possessed by a user, the information processing device storing, at the time of organization of the game-medium set, when a selection input for selecting a quick-execution game medium from among the game media included in the game-medium set is accepted, the selected game medium as a quick-execution game medium in the game-medium set; displaying a quick-execution operation section in a battle screen when the battle is started by using the game-medium set; and executing effect activation processing associated with the quick-execution game medium in the game-medium set, when a user operation with respect to the quick-execution operation section is accepted.

Advantageous Effects of Invention

According to the present invention, when a user operation (player operation) with respect to a quick-execution operation section is accepted in a game for performing a battle using a game-medium set selected from among two or more game-medium sets, effect activation processing associated with a quick-execution game medium in the game-medium set can be executed, thus making it possible to reduce the burden of operation on the player.

DESCRIPTION OF EMBODIMENT

A game system 1 according to an embodiment of the present invention will be described below with reference to the drawings. In this specification, for convenience of description, there are cases where descriptions that are more detailed than necessary are omitted. For example, there are cases where detailed descriptions of matters that are already well known and repeated descriptions of substantially the same configurations are omitted.

Although the game system 1 can be realized by a system in which a plurality of information processing devices are connected via a network, the game system 1 can also be realized by one information processing device. Here, a description will be first given of an embodiment in which the system connected to the network is used. The information processing devices can each be, for example, an electronic device, such as a computer, a smartphone, a server, etc.

Figure 1:
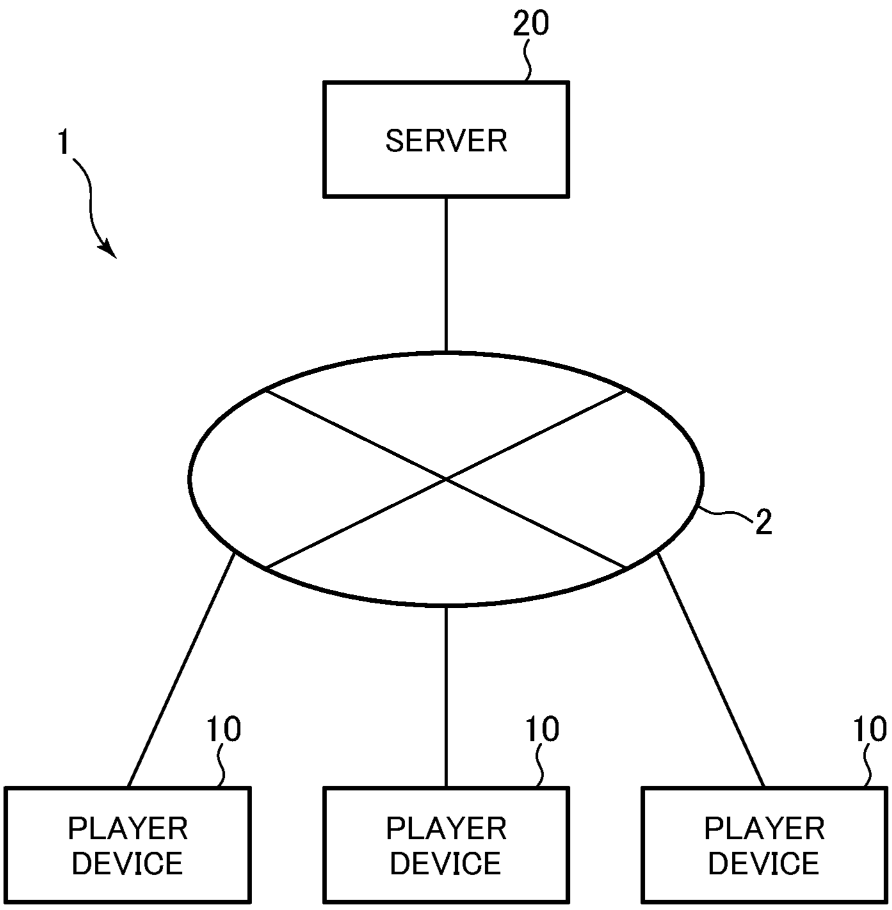
FIG. 1 is a configuration diagram of a system according to an embodiment of the present invention.

FIG. 1 shows an example of the overall configuration of a game system according to one embodiment of the present invention. As shown in FIG. 1, the game system 1 includes player devices 10 and a server 20 that serve as a plurality of information processing devices, and the player devices 10 and the server 20 are connected to a network 2, such as the Internet, so as to be able to communicate with each other. Note that a description will be given on the assumption that the game system 1 of this embodiment is a server-client system.

Figure 2:
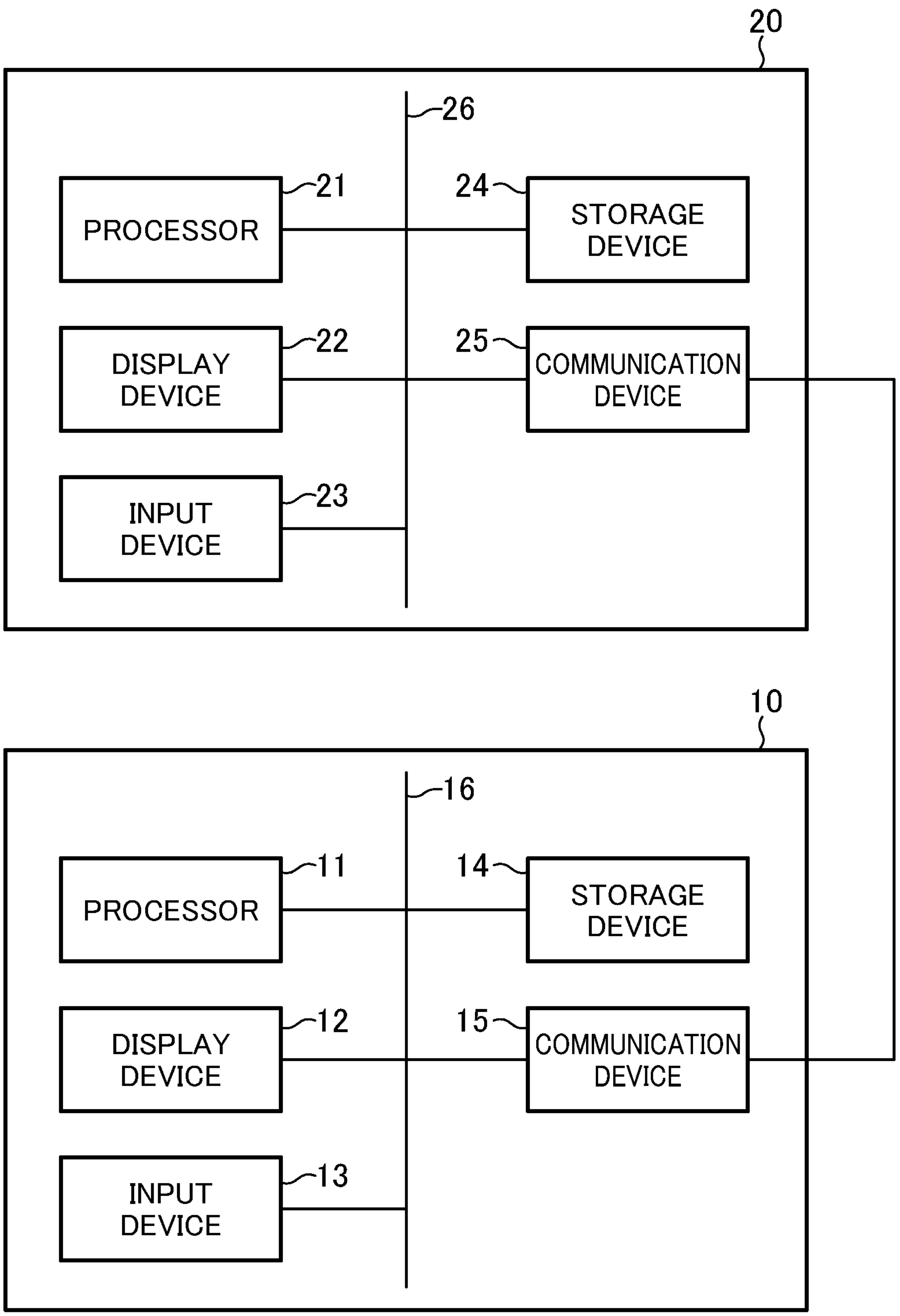
FIG. 2 is a hardware configuration diagram of information processing devices according to the embodiment of the present invention.

FIG. 2 is a block diagram showing the hardware configurations of the server 20 and each of the player devices 10 according to the embodiment of the present invention. Each of the player devices 10 includes a processor 11, a display device 12, an input device 13, a storage device 14, and a communication device 15. The individual constituent devices are connected via a bus 16. Note that it is assumed that interfaces are interposed as needed between the bus 16 and the individual constituent devices. Although the player device 10 is a smartphone in this embodiment, the player device 10 can also be an electronic device, such as a tablet computer, a computer including a contact-type input device like a touchpad, or a game device, as long as the electronic device includes the configuration described above.

Similarly, the server 20 also includes a processor 21, a display device 22, an input device 23, a storage device 24, and a communication device 25. These individual constituent devices are connected via a bus 26. Note that it is assumed that interfaces are interposed as needed between the bus 26 and the individual constituent devices. In this embodiment, the server 20 is realized by a computer.

The processors 11 and 21 control the overall operations at the player device 10 and the server 20, respectively, and are, for example, CPUs. Note that electronic circuits such as MPUs may also be used as the processors 11 and 21. The processors 11 and 21 execute various kinds of processing by loading and executing programs and data stored in the storage devices 14 and 24, respectively. In one example, the processors 11 and 21 are each configured of a plurality of processors.

The display devices (displays) 12 and 22 display application screens etc. to a user (player) of the player device 10 and a user (administrator) of the server 20 according to control of the processors 11 and 21, respectively. Although the display devices 12 and 22 are preferably liquid crystal displays, it is also possible to adopt displays using organic EL, plasma displays, or the like.

The input devices 13 and 23 are user interfaces for accepting inputs from the users to the player device 10 and the server 20, and are, for example, touchscreens, touchpads, keyboards, or mouses. In this embodiment, since the player device 10 is a smartphone, the player device 10 includes a touchscreen as the input device 13, the touchscreen also functions as the display device 12, and the display device 12 and the input device 13 have an integrated structure. It is also possible that the display device 12 and the input device 13 have separate forms disposed at different positions. Since the server 20 is a computer, it is assumed that the server 20 includes a keyboard and a mouse as the input device and includes a liquid crystal display as the display device.

The storage devices 14 and 24 are storage devices that are provided for general smartphones and computers and that include RAMs, which are volatile memories, and ROMs, which are non-volatile memories. The storage devices 14 and 24 can also include external memories. For example, the storage device 14 stores a browser program and a game program, and the storage device 24 stores a server game program. The browser program and the game program are launched in accordance with user operations with respect to the player device 10 and are executed on an operating system (OS) implemented in advance in the player device 10. The server game program includes functions and various kinds of data for performing information processing so as to properly proceed with games on the browser program and the game program executed at each electronic device serving as a client.

In one example, the storage devices 14 and 24 each include a main storage device and an auxiliary storage device. The main storage device is a volatile storage medium that allows high-speed reading and writing of information, and is used as a storage area and a work area when the processor 11 or 21 processes information. The auxiliary storage device stores various programs and data that is used by the processor 11 or 21 when the programs are executed. Although the auxiliary storage device is, for example, a hard disk device, the auxiliary storage device may be any type of non-volatile storage or non-volatile memory that is capable of storing information and may be detachable. The auxiliary storage device stores, for example, an operating system (OS), middleware, application programs, and various kinds of data that may be referred to when these programs are executed.

The communication devices 15 and 25 send data to and receive data from other devices via the network 2 (not shown in FIG. 2). For example, the communication devices 15 and 25 perform mobile communication or wireless communication, such as that using a wireless LAN, to connect to the network 2. The player device 10 uses the communication device 15 to communicate with the server 20 via the network. The communication devices 15 and 25 may perform wired communication using an Ethernet (registered trademark) cable or the like.

Figure 3:
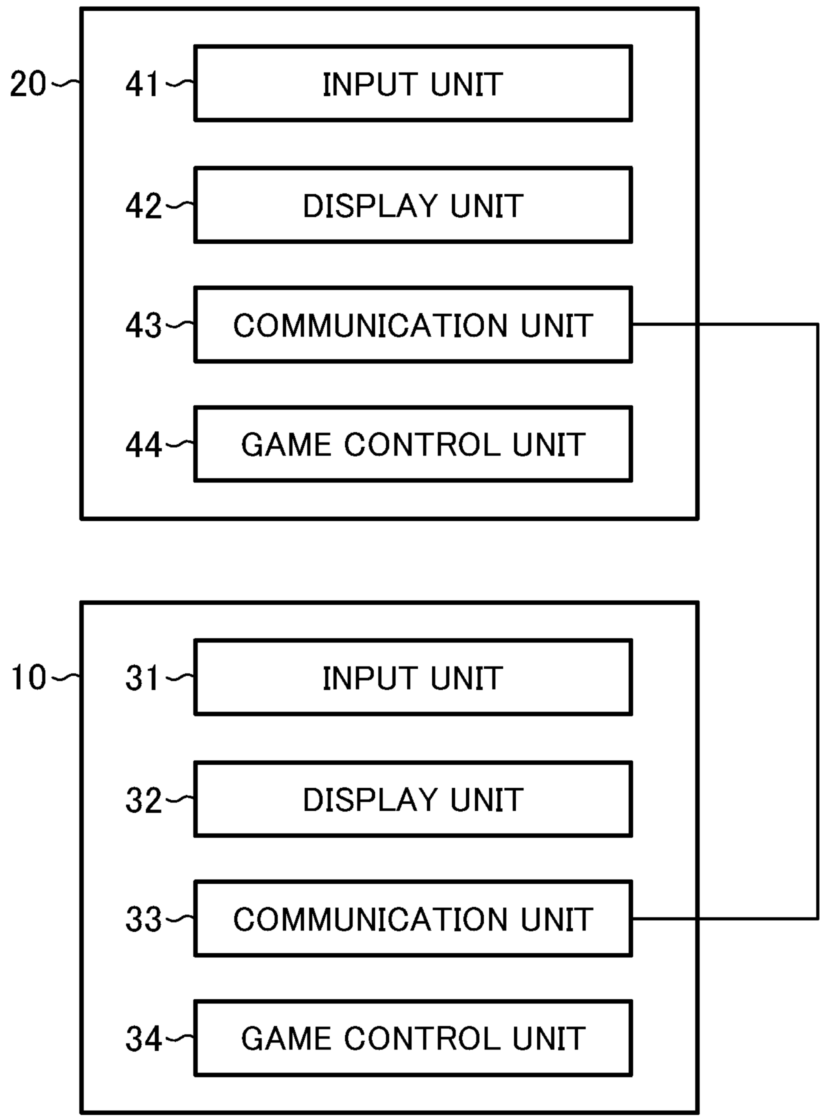
FIG. 3 is a functional block diagram of the information processing devices according to the embodiment of the present invention.

FIG. 3 shows an example of a functional block diagram of the player device 10 and the server 20 according to the embodiment of the present invention. The player device 10 includes an input unit 31, a display unit 32, a communication unit 33, and a game control unit 34, and the server 20 includes an input unit 41, a display unit 42, a communication unit 43, and a game control unit 44. In this embodiment, these functions are realized when the processors 11 and 21 execute programs. For example, the executed programs are the browser program and the game program stored in the storage devices 14 and 24. Since the various kinds of functions are realized by executing the programs, as described above, a portion or the entirety of one part (function) may be included in another part. Alternatively, these functions may be realized by means of hardware by configuring electronic circuits or the like each realizing a portion or the entirety of each of the functions.

The input units 31 and 41 are configured by using the input devices 13 and 23, respectively, and accept inputs from the users to the player device 10 and the server 20. The player device 10 and the server 20 accept user inputs by means of the input units 31 and 41. In this embodiment, in the player device 10, a touch detection function generally provided for a smartphone, which is provided with the touchscreen, can be used.

The display unit 32 displays game screens on the display device 12 and displays game screens in accordance with the proceeding of the game and user operations (player operations). The game control unit 34 performs control processing for executing the game of this embodiment and stores various kinds of data required for the processing. In this embodiment, the game control unit 34 uses the browser program to perform processing of information to be input from or output to the user, processing of signals to be sent to or received from the server 20, etc. In the case where a game application is installed in the player device 10 to execute a game, the game control unit 34, which is realized by the game application, executes various kinds of information processing, such as game progression, data management, etc., for executing the game.

The display unit 42 displays a management screen for a game administrator, as needed, on the display device 22. The game control unit 44 performs processing for the game executed at the player device 10 of this embodiment. In one example, when the browser is launched in the player device 10, the game control unit 34 is realized, and the server 20 is accessed in order to proceed with the game, the game control unit 44 sends data thereto and receives data therefrom regularly or as needed, to proceed with the game. For example, the game control unit 44 stores various kinds of data etc. required for the control processing for executing the game of this embodiment and appropriately provides such data to the player device 10. The various kinds of data include information about game media and game-medium sets.

In this embodiment, one game-medium set can include two types of game-medium sets, character game media are included in a first-type game-medium set, and item game media are included in a second-type game-medium set. Although it is assumed that the item game media are summon stones here, the item game media may also be other items, such as weapons.

The game control unit 44 stores basic information about first-type and second-type game media, as information common to all players. Here, a CID is an identifier of a first-type game medium, and an IID is an identifier of a second-type game medium, the CID and the IID being common to all players and unique. The game control unit 44 stores skill activation processing, effect activation processing, etc. in association with the CID and the IID. Two or more pieces of skill activation processing are associated with the CID of each first-type game medium, and one piece of effect activation processing is associated with the IID of each second-type game medium. Furthermore, for example, image information, voice information, etc., for expressing a game medium and a production are stored in association with the CID and the RID. In this embodiment, for each second-type game medium (item game medium), a main-set-time enhancement effect to be activated when the second-type game medium is set as a main item is stored.

The game control unit 44 further stores information about game media and game-medium sets that are stored for each player. Examples of these pieces of information are shown in Tables 1 to 3.

TABLE 1

| Table of first-type game media possessed by player Attacking power | | | | |
|---|---|---|---|---|
| RCID | CID | Lv | Attacking Power | HP |
| RC00 | C619 | 150 | 15230 | 2970 |
| RC01 | C519 | 75 | 8782 | 1718 |
| RC02 | C671 | 75 | 6680 | 1601 |
| RC03 | C119 | 1 | 741 | 500 |
| RC04 | C817 | 100 | 10860 | 1980 |
| RC05 | C589 | 61 | 7640 | 1900 |
| RC06 | C700 | 66 | 7882 | 1540 |
| | | . . . | | |

TABLE 2

| Table of second-type game media possessed by player Attacking power | | | | |
|---|---|---|---|---|
| RIID | IID | Lv | Attacking Power | HP |
| RI00 | I691 | 150 | 3640 | 1219 |
| RI01 | I512 | 100 | 1782 | 718 |
| RI02 | I671 | 50 | 1680 | 902 |
| RI03 | I691 | 1 | 561 | 230 |
| RI04 | I817 | 75 | 2810 | 2100 |
| RI05 | I589 | 75 | 901 | 820 |
| RI06 | I700 | 10 | 882 | 540 |
| | | . . . | | |

TABLE 3

| Table of game-medium sets | | | | | | | | | | |
|---|---|---|---|---|---|---|---|---|---|---|
| SID | RCID1 | RCID2 | RCID3 | RCID4 | RIID1 | RIID2 | RIID3 | RIID4 | RIID5 | QID |
| 0 | RC92 | RC03 | RC65 | RC93 | RI18 | RI59 | RI71 | RI26 | RI32 | RI18 |
| 1 | RC05 | RC967 | RC23 | RC40 | RI61 | RI68 | RI91 | RI67 | RI81 | RI68 |
| 2 | RC01 | RC361 | RC16 | RC78 | RI59 | RI09 | RI46 | RI35 | RI87 | null |
| 3 | RC52 | RC11 | RC90 | RC87 | RI98 | RI36 | RI77 | RI88 | RI34 | RI88 |
| 4 | RC92 | RC12 | RC87 | RC61 | RI67 | RI66 | RI43 | RI75 | RI19 | RI67 |
| 5 | RC92 | RC65 | RC31 | RC95 | RI55 | RI77 | RI41 | RI12 | RI69 | RI69 |
| | | | | | . . . | | | | | |

Tables 1 and 2 are examples of tables showing first-type and second-type game media possessed by the player and stored in the game control unit 44, and Table 3 is an example of a table showing game-medium sets. Tables 1 to 3 are created for each player and are stored in the game control unit 44 in association with the corresponding player ID.

In Table 1, an RCID is an identifier of a first-type game medium possessed by the player, the identifier being used by the player, and is uniquely assigned to each player identifier. For example, the RCID is sequentially assigned when the player obtains a first-type game medium and registers the CID thereof in Table 1. The Lv (level), the attacking power, and the HP (hit points) of the first-type game medium identified by the CID are further stored in association with the RCID.

In Table 2, an RIID is an identifier of a second-type game medium possessed by the player, the identifier being used by the player, and is uniquely assigned to each player identifier. For example, the RIID is sequentially assigned when the player obtains a second-type game medium and registers the IID thereof in Table 2. The Lv, the attacking power, and the HP of the second-type game medium identified by the IID are further stored in association with the RIID. It is assumed that one player can possess two or more game media that are identified by the same IID. Even game media that are identified by the same IID can be stored by being distinguished by RIIDs.

The parameters in Tables 1 and 2 are not limited to these parameters, and Tables 1 and 2 may include other parameters or need not include all or some of these parameters. The player proceeds with a game to raise the level of a game medium and to increase the attacking power and the HP thereof in accordance with the raising of the level, thus making it possible to advantageously proceed with the game.

It is also possible that the attacking power and the HP in Tables 1 and 2 are not stored in Tables 1 and 2 and are calculated as needed on the basis of the Lv, the CID, and the IID. Furthermore, information about skill activation processing etc. common to all players and stored in the game control unit 44 may be included in Table 1 and Table 2.

Table 3 is a table of information indicating game-medium sets. It is assumed that one game-medium set includes one or more first-type game media and two or more second-type game media. Here, up to four first-type game media and up to five second-type game media can be included. The number of types of game media included in one game-medium set may also be only one or three or more. Furthermore, the number of game media of each type included in one game-medium set may also be one or more. In Table 3, an SID indicates an identifier of a game-medium set, and RCID1 to RCID4 and RIID1 to RIID5 indicate that game media identified by the SSID are included.

A QID is information indicating a game medium that is set as a quick-execution game medium. The game medium that can be set as a quick-execution game medium is any game medium in the second-type game-medium set associated with the game-medium set. Therefore, any RIID of the RIID1 to the RIID5 can be set as the QID. In the case where no RIID is set as the QID, null is shown in the QID, which indicates that a quick-execution game medium is not set. For example, when the SID is 0, since the QID is RI18, it is indicated that the game medium in the RIID1 is set as a quick-execution game medium. When the SID is 2, since the QID is null, this means that a quick-execution game medium is not set.

Here, any game medium in only the second-type game-medium set can be set as a quick-execution game medium. If only one piece of skill activation processing is associated with each first-type game medium, the first-type game medium may also be similarly set as a quick-execution game medium. It is also possible that a quick-execution game medium is selected from among either the first-type game media or the second-type game media. Furthermore, even when two or more pieces of skill activation processing are associated, in the case where processing to be executed is identified on the basis of certain rules, the corresponding game medium can be set as a quick-execution game medium. For example, it is also possible that one of the two or more pieces of skill activation processing is set as a quick execution target in advance.

When a battle is started by using a game-medium set, the game control unit 44 makes a quick-execution operation section displayed in a battle screen. When a user operation with respect to the quick-execution operation section is accepted, the game control unit 44 executes the effect activation processing associated with the quick-execution game medium in the game-medium set.

Next, information processing for organizing a game-medium set, executed in the game system 1 according to the embodiment of the present invention will be described. The game system of this embodiment is a system for a game for performing a battle with an enemy character by using a game-medium set organized by including two or more game media selected from among a plurality of game media that can be used by the user. The player can organize two or more game-medium sets. The player organizes game-medium sets and stores the game-medium sets in the game control unit 44 before starting a battle, selects any of the game-medium sets when starting the battle, and performs the battle.

Figure 4:
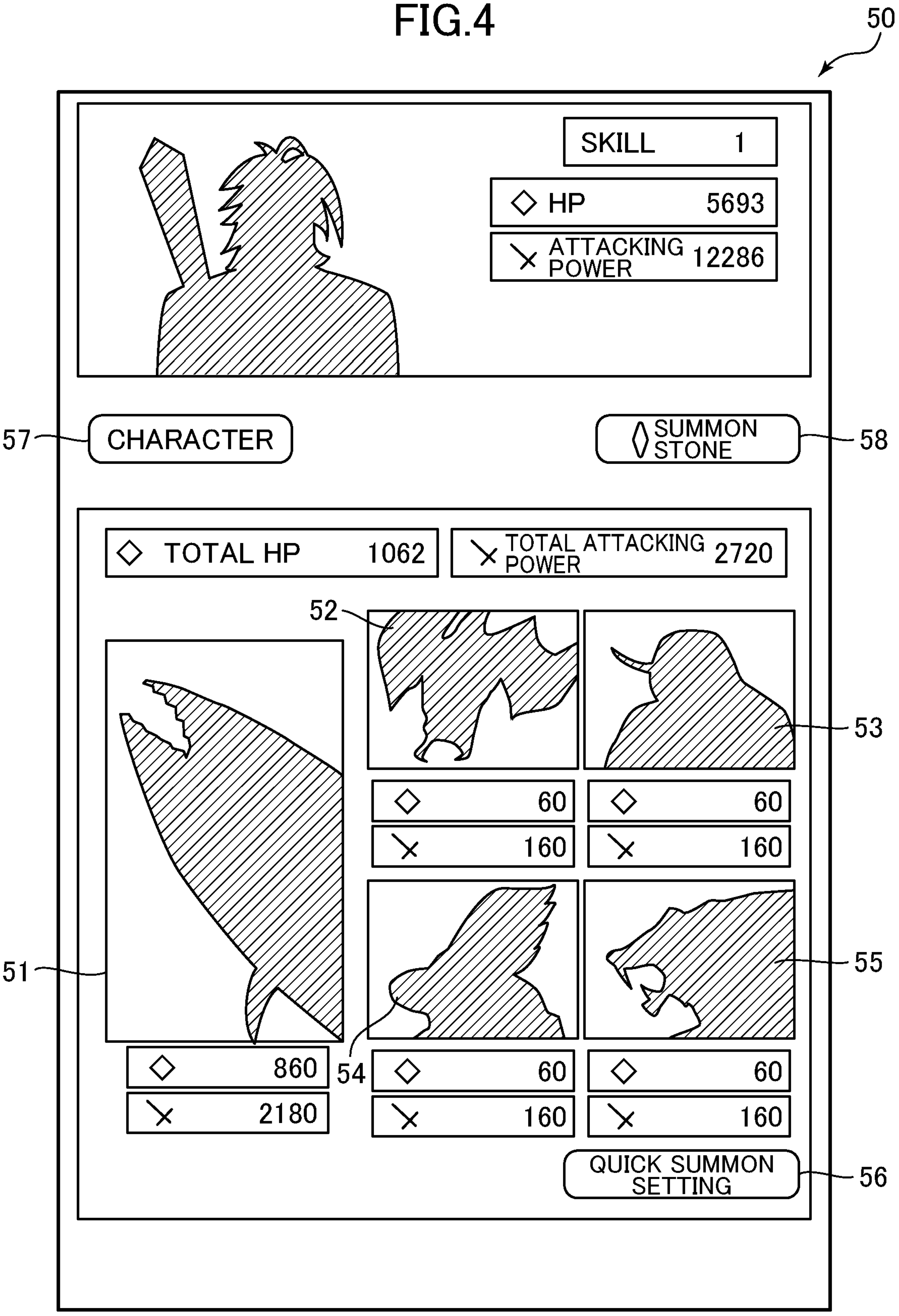
FIG. 4 shows an example of a game screen according to the embodiment of the present invention.

First, when the player, who wishes to organize a game-medium set, performs a user operation input for a game-medium-set organization request in a game screen displayed on the display device 12 of the player device 10, the game-medium organization request is sent to the server 20. It is assumed that the game-medium-set organization request contains an SID determined on the basis of information specified by the player. When the game-medium-set organization request is received, the server 20 sends, to the player device 10, game-medium-set organization screen information for organizing a game-medium set to be associated with the SID contained in the received request. The player device 10 displays a game-medium-set organization screen on the display device 12 on the basis of the received information. FIG. 4 shows an example of the game-medium-set organization screen.

In FIG. 4, when an operation input is performed by touching a user operation section 57, an organization screen for setting an organization of character game media (first-type game media) is displayed, and, when a user operation section 58 is touched, an organization screen for setting an organization of item game media (second-type game media) is displayed. An organization screen 50 of FIG. 4 is an example of an organization screen for second-type game media. User operation sections 51 to 55 show item game media (summon stone media) 1 to 5 that are currently set, and, by touching each of the user operation sections, the corresponding item game medium can be changed. An item game medium 1 made to correspond to the user operation section 51 is an item set as a main item, and the main-set-time enhancement effect, which is set in advance for the item game medium that is set as the main item, can be obtained after the battle is started.

Figure 5:
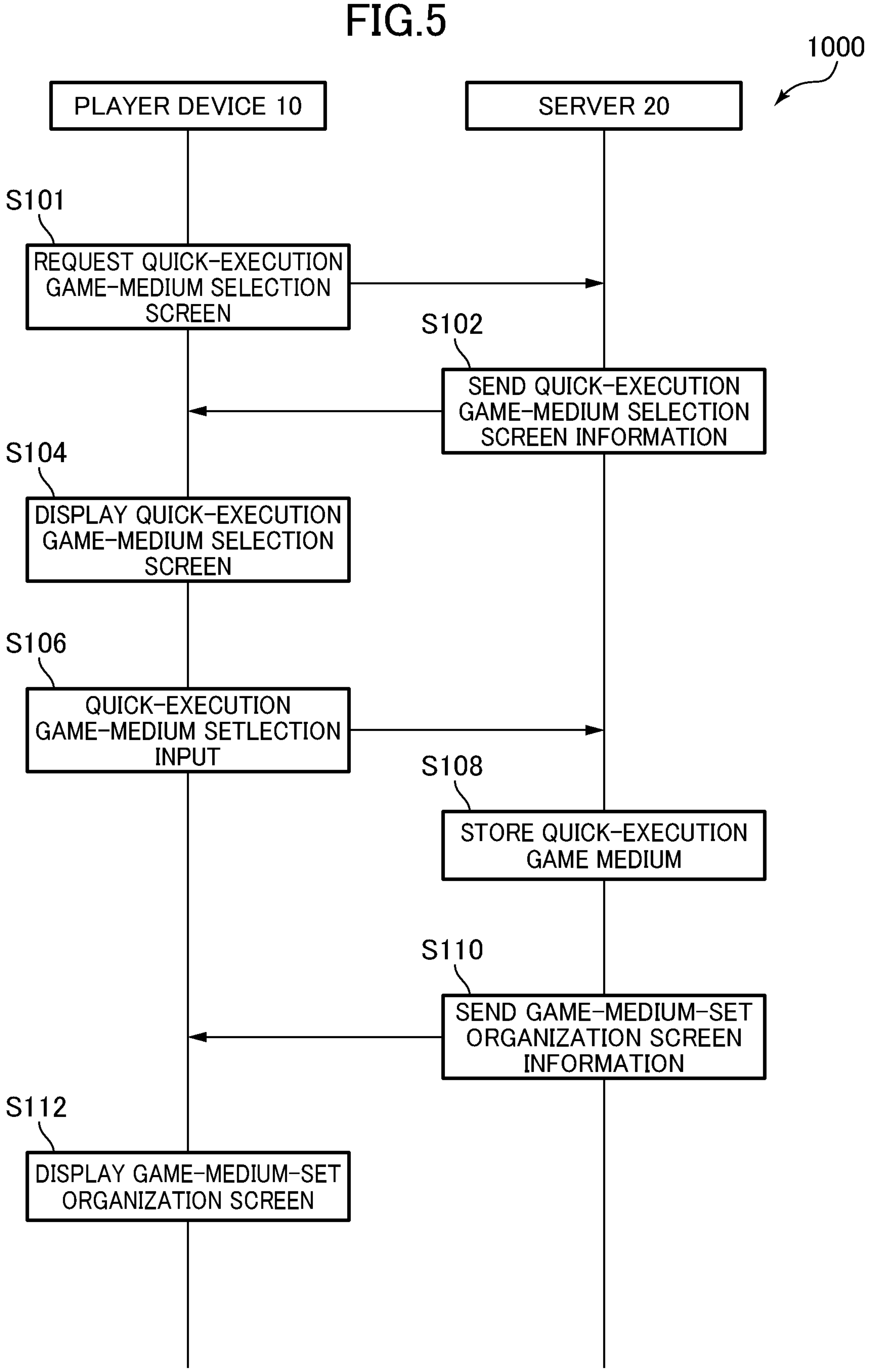
FIG. 5 is a flowchart showing information processing according to the embodiment of the present invention.
Figure 6:
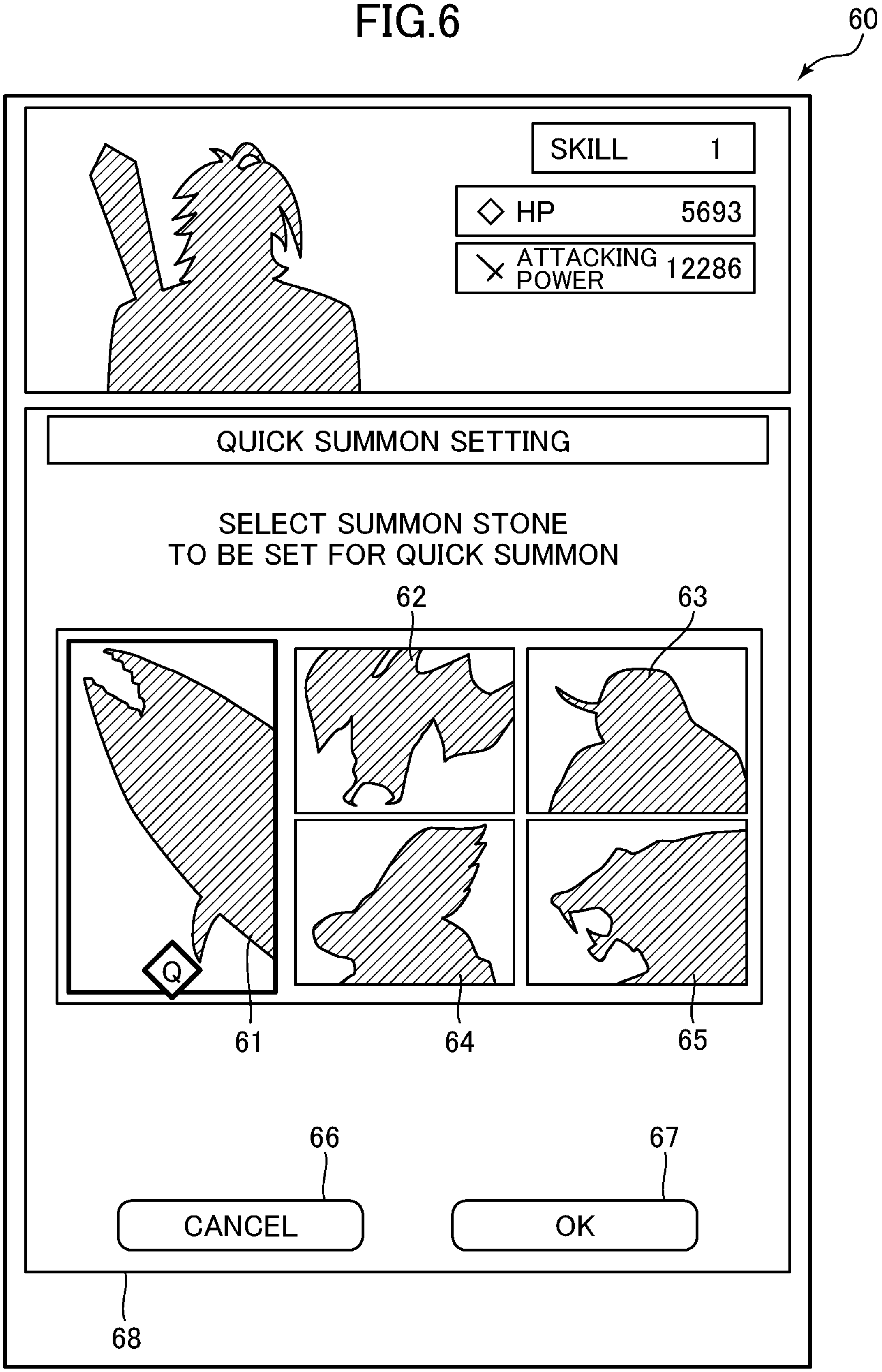
FIG. 6 shows an example of a game screen according to the embodiment of the present invention.

When the player performs an operation input by touching a quick-execution game-medium selection request operation section 56, quick-execution game-medium selection processing can be started. The quick-execution game-medium selection processing will be described by using a flowchart shown in FIG. 5. When the player touches the quick-execution game-medium selection request operation section 56, a display request for a selection screen for selecting a quick-execution game medium is sent to the server 20 (S101). When this request is received, the server 20 sends quick-execution game-medium selection screen information to the player device 10 (S102). Then, the player device 10 displays a quick-execution game-medium selection screen (S104). FIG. 6 shows an example of the quick-execution game-medium selection screen. In this embodiment, quick execution is referred to as quick summon, and an item game medium that is set for quick summon is referred to as a quick summon stone.

In a game screen 60 shown in FIG. 6, a quick-execution game-medium selection screen 68 is displayed as a pop-up display overlapped with the game-medium-set organization screen of FIG. 4. User operation sections 61 to 65 show item game media (summon-stone game media) 1 to 5 that are currently set. When each of the user operation sections is touched, the item game medium shown in that user operation section can be set as a selection candidate for the quick-execution game medium. Information for showing the game medium that is currently set as a selection candidate can be displayed. In FIG. 6, the user operation section 61 is surrounded by a bold line, thereby indicating that the user operation section 61 has been set as a selection candidate. Furthermore, “Q” displayed on the user operation section 61 indicates that the game medium shown in the user operation section 61 is currently set as a quick-execution game medium.

After a user operation input is performed with respect to any of the user operation sections 61 to 65 to set the user operation section as a selection candidate, when a user operation is performed with respect to a decision operation input section 67, a selection input for setting, as a quick-execution game medium, the game medium associated with the user operation section set as the selection candidate is sent to the server 20 (S106). When this selection input is received, the server 20 stores the selected game medium as a quick-execution game medium in the identified game-medium set (S108). Every time a selection candidate is selected, it is also possible to communicate with the server 20 to update the game screen.

As an example of specific processing, the RIID of the selected game medium is registered in the QID field for the target SID in Table 3. When the quick-execution game medium is stored, the server 20 sends game-medium-set organization screen information (S110), and the player device 10 returns to the state in which the game-medium-set organization screen, which is shown in FIG. 4, is displayed (S112). Although a flowchart corresponding to a case in which an operation input is performed with respect to a cancel operation section 66 is omitted in FIG. 5, it is assumed that the player device 10 returns to the game-medium-set organization screen, which is shown in FIG. 5, without performing setting of a quick-execution game medium.

Figure 7:
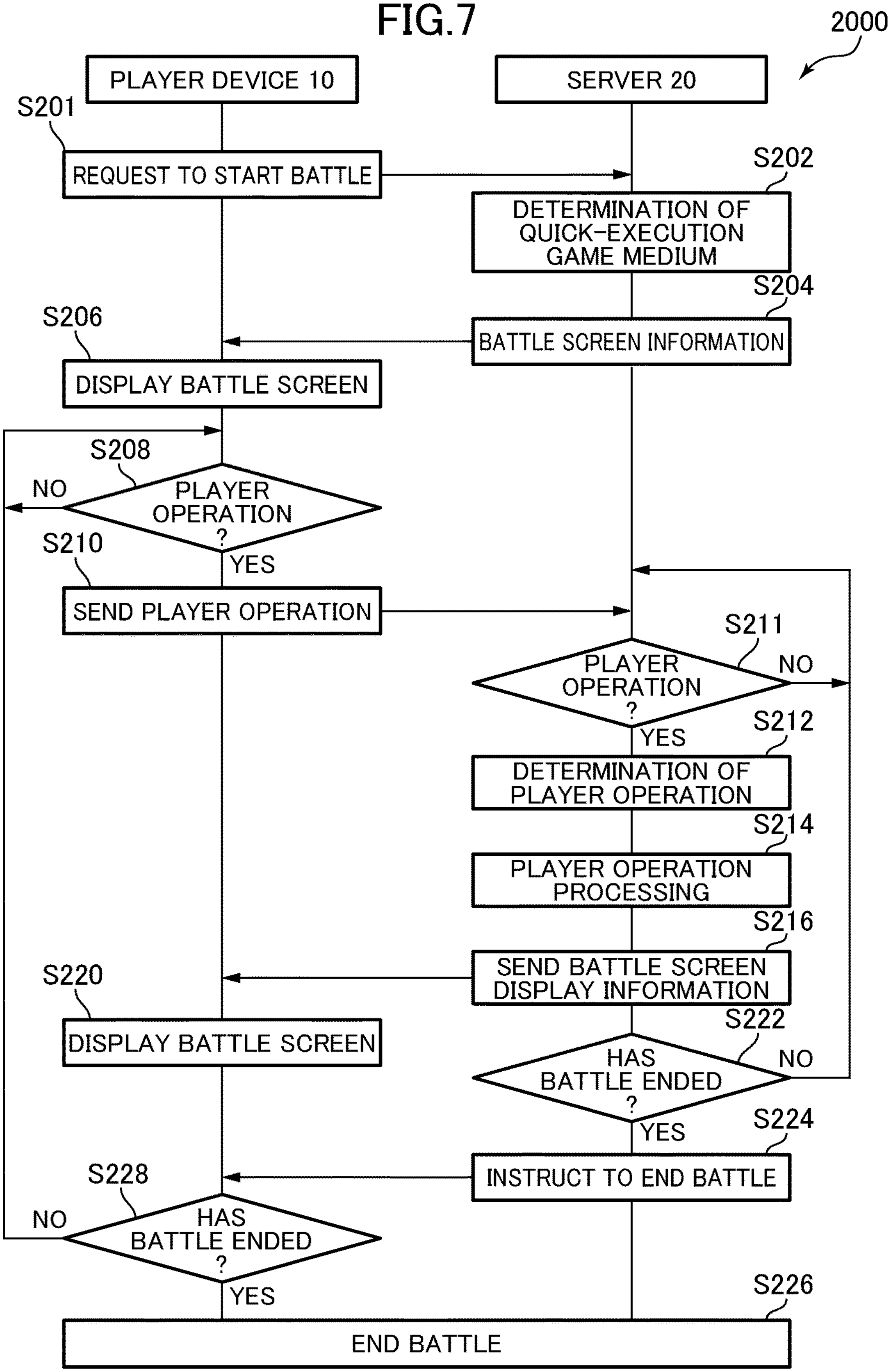
FIG. 7 is a flowchart showing information processing according to the embodiment of the present invention.

Next, information processing for executing a battle executed in the game system 1 according to the embodiment of the present invention will be described by using a flowchart shown in FIG. 7. When the player performs an operation input with respect to an operation section for starting a battle at the player device 10, a request for starting the battle is sent to the server 20 (S201).

It is assumed that a game-medium set to be used in the battle is contained in the battle start request. Furthermore, in the game-medium set to be used in the battle, it is possible to use a second-type game medium possessed by another player, in addition to the game media included in the game-medium set selected by the player from among the game-medium sets that are organized in advance and are stored in the game control unit 44.

For example, the game-medium set information contained in the battle start request can include, in addition to the information associated with the selected SID and included in Table 3, the player identification information (PID) of another player selected by the player who starts the battle, and the RIID of a second-type game medium possessed by this other player. When the battle start request is received, the server 20 generates data about the game-medium set to be used in the battle. Table 4 shows an example of the generated data.

TABLE 4

| Data about game medium set used in battle | | | | | | | | | | |
|---|---|---|---|---|---|---|---|---|---|---|
| RCID1 | RCID2 | RCID3 | RCID4 | RIID1 | RIID2 | RIID3 | RIID4 | RIID5 | RIID6 | QID |
| RC92 | RC03 | RC65 | RC93 | RI18 | RI59 | RI71 | RI26 | RI32 | P6128 RI62 | RI18 |

In addition to the RCID1 to the RCID4 and the RIID1 to the RIID5 included in the selected game-medium set, a game medium possessed by the selected other player is set in the RIID6. The RIID6 indicates an item possessed by the other player and includes the player identifier (P6128) of the other player and an RIID (RI162) associated with this player identifier. It is also possible that the game-medium set to be used in the battle is determined by the server 20 or that a game medium possessed by another player is not used. Furthermore, Table 4 may include information about the attacking power etc. associated with each of the game media, or it is also possible that Table 4 is not generated, and Table 3 etc. are referred to by using the game-medium set identifier and the identifier of another player.

The server 20 determines whether a quick-execution game medium has been set in the game-medium set to be used in the battle (S202). A basic operation section(s) is displayed in a battle screen, and, in the case where the quick-execution game medium has been set in the game-medium set to be used in the battle, the server 20 generates battle screen information for displaying the quick-execution operation section instead of the one or more basic operation sections, and sends the battle screen information to the player device 10 (S204). The basic operation section(s) is one or more operation sections displayed in the case where the quick-execution game medium has not been set. In the case where the quick-execution game medium has been set, it is also possible to further display the quick-execution operation section in addition to all the basic operation section(s).

Figure 8:
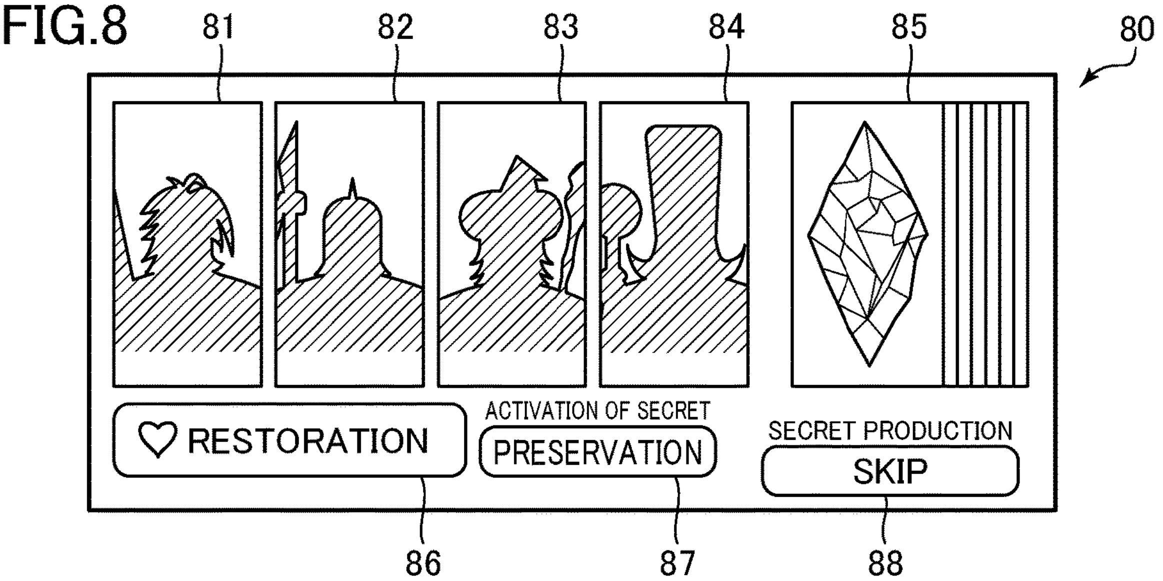
FIG. 8 shows an example of a game screen according to the embodiment of the present invention.
Figure 9:
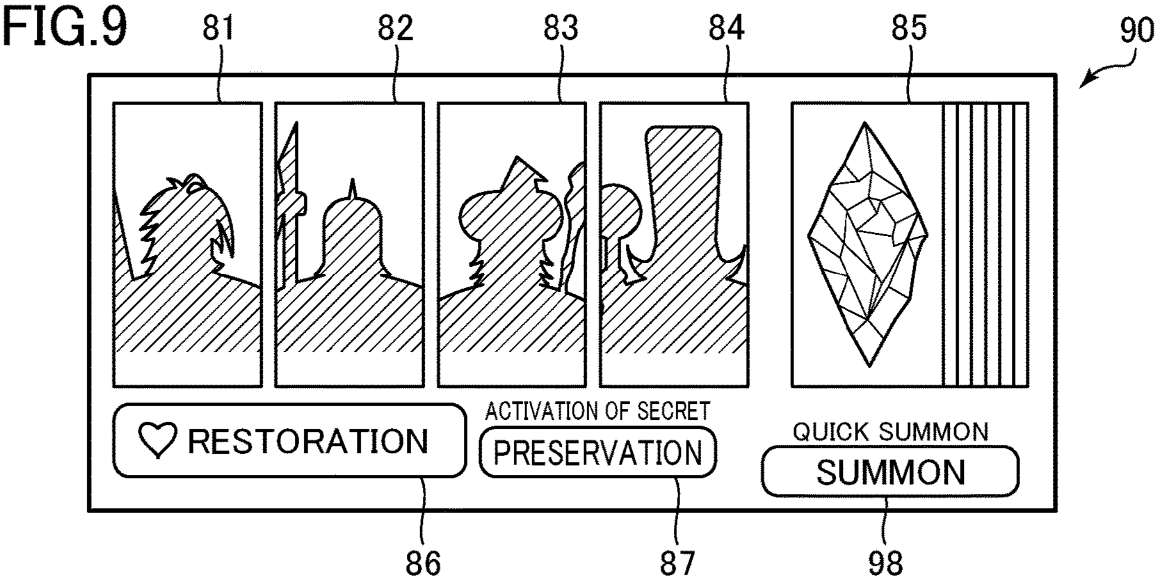
FIG. 9 shows an example of a game screen according to the embodiment of the present invention.

The player device 10 displays a battle screen on the display device 12 on the basis of the received battle screen information (S206). FIGS. 8 and 9 show examples of a player operation area included in the battle screen. The player operation area is an area that includes one or more player operation sections, in the battle screen. The battle screen may include two or more player operation areas or may include an individual player operation section(s). The player operation area may include a display area or the like other than the user operation section(s). FIG. 8 shows a player operation area 80 displayed in the case where the quick-execution game medium has not been set, and FIG. 9 shows a player operation area 90 displayed in the case where the quick-execution game medium has been set.

In FIGS. 8 and 9, player operation sections 81 to 84 are operation sections that show first-type game media (player characters) 1 to 4 included in the game-medium set used in the battle and that accept user operation inputs with respect to the individual game media. A player operation section 85 is a non-quick-execution operation section that accepts an operation input for selecting a player operation related to the second-type game medium for executing the effect activation processing.

A player operation section 86 is an operation section that accepts a player operation input for restoring the HPs of the first-type game media (player characters) during the battle. A player operation section 87 is an operation section for selecting to execute a secret attack, which is a powerful attack executed by a player character during the battle, in the case where a condition for the secret attack has been satisfied, or to suspend the execution even when the condition therefor has been satisfied. A player operation section 88 is a battle-production display selection section for selecting to display a production with a perfect battle screen or to display a simplified production, when the secret attack is executed. The player operation sections 81 to 88 are the basic operation sections. In addition, the battle screen can include, as a basic operation section, for example, a player operation section (not shown) for executing attack processing to be performed by a player character.

In FIG. 9, a player operation section 98 is a quick-execution operation section for accepting a player operation input for executing the effect activation processing associated with the quick-execution game medium in the game-medium set used in the battle. In this embodiment, in the case where it is determined that the quick-execution game medium has been set, although the quick-execution operation section 98 is displayed instead of the battle-production display selection section 88 among the basic operation sections 81 to 88, the quick-execution operation section 98 may also be displayed instead of any of the other basic operation sections or in addition to the basic operation sections 81 to 88.

When the battle screen is displayed, the player device 10 waits for an operation input from the player (S208). When the player performs an operation input by touching any of the player operation sections, the player device 10 sends, in response to this operation input, the player operation input to the server 20 (S210). When the player operation input is accepted (S211), the server 20 determines what player operation input has been performed (S212). Then, the server 20 executes information processing on the basis of the player operation determined through determination of the player operation input (S214), generates new battle-screen display information on the basis of the executed information processing, and sends the battle-screen display information to the player device 10 (S216).

The player device 10 updates the battle screen displayed on the display device 12, on the basis of the received battle-screen display information (S220). The server 20 determines whether the battle has ended (S222), as a result of the player operation processing (S214). For example, the server 20 determines whether the HPs of the player characters or the HP of the enemy character becomes zero, and determines that the battle has ended when the HPs of the player characters or the HP of the enemy character becomes zero. In the case where it is determined that the battle has ended, the server 20 sends a battle end instruction to the player device 10 (S224).

The server 20 further executes processing for ending the battle (S226). For example, the server 20 can send, to the player device 10, screen information indicating that the battle has ended. The player device 10 determines whether the battle end instruction has been received (S228). In the case where the battle end instruction has been received, the player device 10 executes processing for ending the battle on the basis of the information sent from the server 20. For example, a screen indicating that the battle has ended is displayed, and the screen is transitioned to a next game screen (S226). In the case where the battle has not ended, the player device 10 and the server 20 return to wait for a player operation (S208, S211).

When a player operation input with respect to the player operation section 85 is performed as a player operation input in S208, the server 20 determines that this is a player operation input for selecting a second-game-type game medium (S212), generates information for displaying an effect-activation game-medium selection screen for selecting any of the second-type game media included in the currently used game-medium set (S214), and sends the information to the player device 10 (S216). The player device 10 updates the battle screen display so as to include the effect-activation game-medium selection screen on the basis of the information (S220), and waits for a next player operation (S206).

Figure 10:
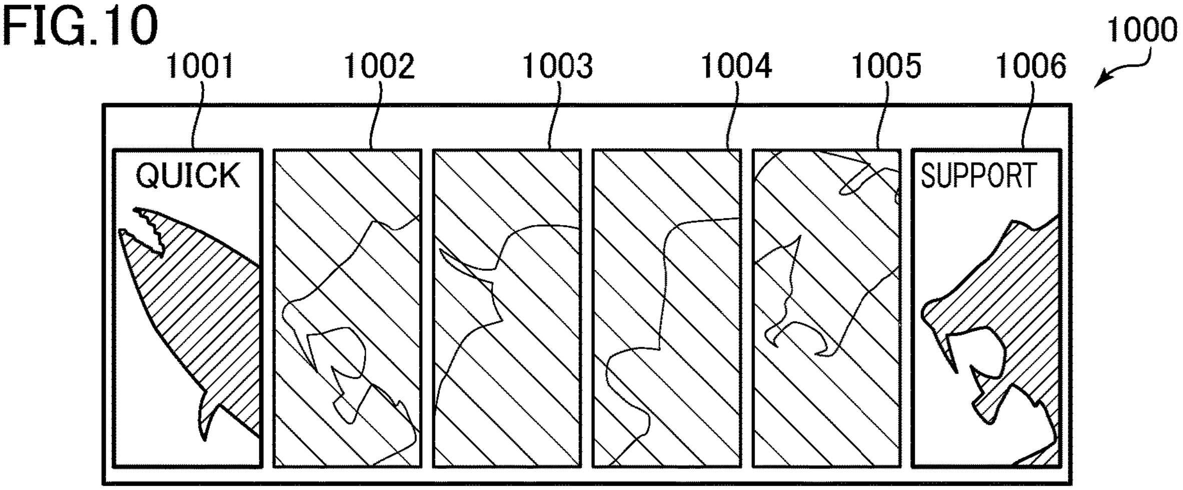
FIG. 10 shows an example of a game screen according to the embodiment of the present invention.

FIG. 10 shows an example of the effect-activation game-medium selection screen. In the effect-activation game-medium selection screen, player operation sections 1001 to 1006 are displayed as second-type game-medium selection sections, and the individual player operation sections are associated with the individual second-type game media included in the game-medium set.

Among the second-type game-medium selection sections, in the player operation section made to correspond to the game medium that has been set as the quick-execution game medium, it is possible to present information indicating that the game medium made to correspond to this player operation section has been set as the quick-execution game medium. For example, in FIG. 10, "QUICK" is displayed in the player operation section 1001, thereby indicating that the game medium made to correspond to the player operation section 1001 has been set as the quick-execution game medium.

When a player operation input made to correspond to the second-type game medium, among the player operation sections 1001 to 1006, is performed in order to execute the effect activation processing, in this embodiment, a confirmation display of whether the effect activation processing is executed or not is popped up. When a confirmation operation section is touched (S208), the player operation input is sent (S210). Then, it is determined that the player operation input is a player operation for the effect activation associated with the second-type game medium corresponding to the selected player operation section (S212), and the effect activation processing is executed (S214).

The effect activation processing can be, for example, processing for making an attack on the enemy character to reduce the HP of the enemy character, processing for raising the attacking power of the player character by a predetermined rate, or the like. Note that, although the selection input for the player operation sections 1001 to 1006 and the touch input for the confirmation operation section in the pop-up display are executed in the processing only in the player device 10, the individual operation inputs may be treated as independent operation inputs to execute the processing from S208 to S228.

When the effect activation processing is identified and executed, the server 20 updates battle display information on the basis of the effect activation processing and sends the battle display information to the player device 10 (S216). For example, in the case where the effect activation processing is an attack on the enemy character and is processing for reducing the HP of the enemy character, the server 20 sends, to the player device 10, screen display information including production animation information for expressing the attack on the enemy character and information indicating the reduced HP of the enemy character. On the basis of the screen display information, the player device 10 displays, on the display device 12, production animation and a screen including the information indicating the reduced HP of the enemy character (S220).

In the case where the player operation input is an operation input with respect to the player operation section (quick-execution operation section) 98, the effect activation processing associated with the quick-execution game medium that is set in the game-medium set used in the battle is executed. When the player performs an operation input by touching the player operation section 97, the quick-execution player operation is sent to the server 20 (S210), and it is determined that this is a quick-execution player operation (S212, S212). The server 20 refers to Table 4 stored in the game control unit 44, to identify the quick-execution game medium in the game-medium set used in the current battle. For example, the server 20 refers to Table 4 to identify that the game medium having RI18 as the QID is the quick-execution game medium.

The game control unit 44 identifies the item identifier IID of the quick-execution game medium by referring to Table 2 on the basis of the identified QID and further executes the effect activation processing associated with the item identifier IID on the basis of the information stored in the game control unit 44.

Therefore, in the case where the effect activation processing associated with the quick-execution game medium is executed, the effect activation processing can be executed with a single user operation when the quick-execution operation section 98 is used, whereas three user operations are required to execute the effect activation processing via the non-quick-execution operation sections 85 and 1101 to 1106 and the confirmation operation section.

There is a known game style in which it is necessary to perform a number of rounds of a battle with a predetermined enemy character, so-called grinding, in order to compete with another player for the number of points obtained by winning the battle with the enemy character within a predetermined period of time, or in order to obtain an item(s) required in the game. In such a game, if the time required for one battle is long or the man-hours (the number of user operation inputs) therefor is large, there is a possibility that players feel stress, players lose interest in the game, and even the number of active players of the game is reduced. Therefore, reducing the time and the man-hours required for one battle as much as possible to keep the player's sense of immersion is an extremely important issue in the game system.

Even when the effect associated with the second-type game medium is advantageous to the player, if a plurality of user operations are required to activate the effect, this results in an increase in the time and the man-hours spent to end the battle, in some cases. Thus, even though the effect associated with the second-type game medium is advantageous to the player, performing the battle without executing processing for activating this effect is more efficient as a whole, and this effect activation processing is not executed, in some cases.

As described above, three user operations are required in the case where the non-quick-execution operation sections 85 and 1101 to 1106 and the confirmation operation section are used in order to execute the effect activation processing. In contrast to this, when the quick-execution operation section 98 is used, the effect activation processing associated with the quick-execution game medium can be executed with only a single user operation with respect to the quick-execution operation section 98, thereby making it possible to reduce the stress of the player and to reduce the time required for the battle. Furthermore, since the effect advantageous to the player can be executed with fewer man-hours, it is possible to prompt execution of the effect activation processing associated with the quick-execution game medium, to proceed with the battle in an advantageous state due to the activated effect, and to reduce the time required for the battle.

Figure 11:
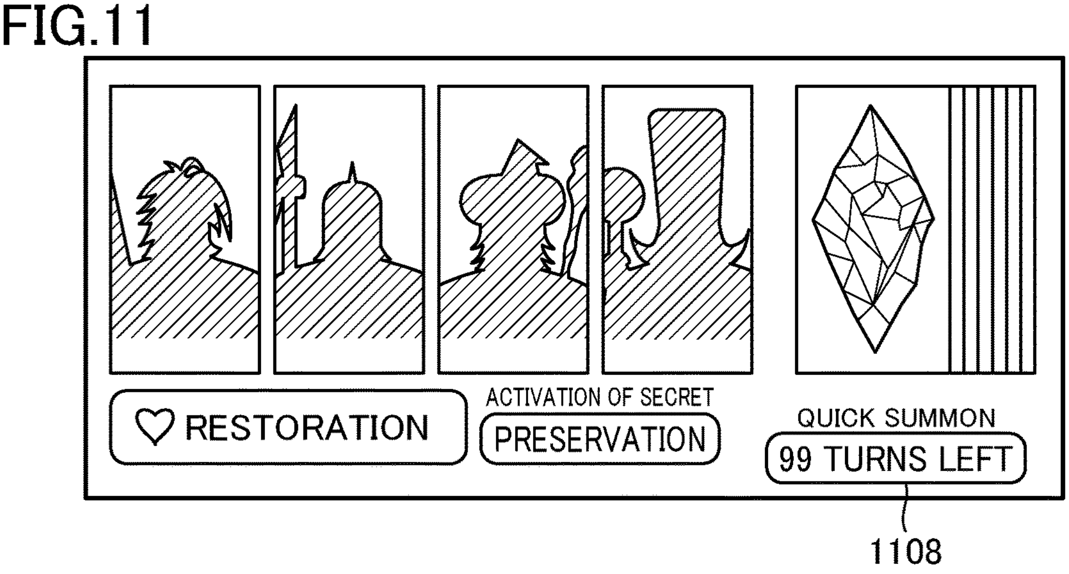
FIG. 11 shows an example of a game screen according to the embodiment of the present invention.

The battle in this embodiment is performed on a so-called turn-basis. Specifically, the player and the enemy character perform actions in turn, and an action of the player and an action of the enemy character form one turn. It is assumed that, when the effect activation processing of the second-type game medium is executed once, the effect activation processing cannot be executed again until a predetermined number of turns has been performed. It is assumed that a required number of turns to be performed is set for each game medium. As shown in a quick-execution operation section 1108 in FIG. 11, when the effect activation processing of the quick-execution game medium is executed, an operation with respect to the quick-execution operation section is disabled, and the remaining number of turns required to allow the next effect activation processing to be executed can be displayed. The remaining number of turns is reduced each time a turn is performed, and, when the remaining number of turns reaches zero, an operation with respect to the quick-execution operation section is enabled, thus allowing the effect activation processing to be executed again.

Figure 12:
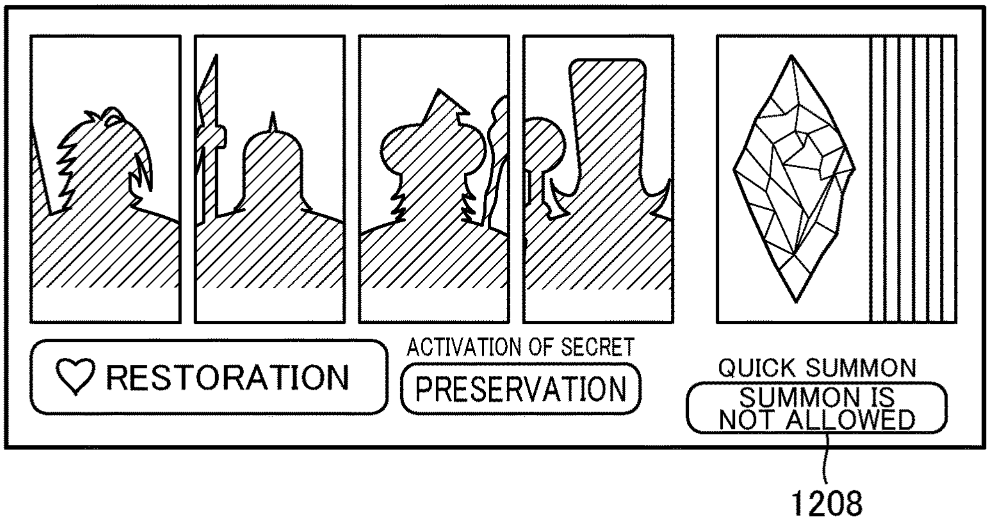
FIG. 12 shows an example of a game screen according to the embodiment of the present invention.
Figure 13:
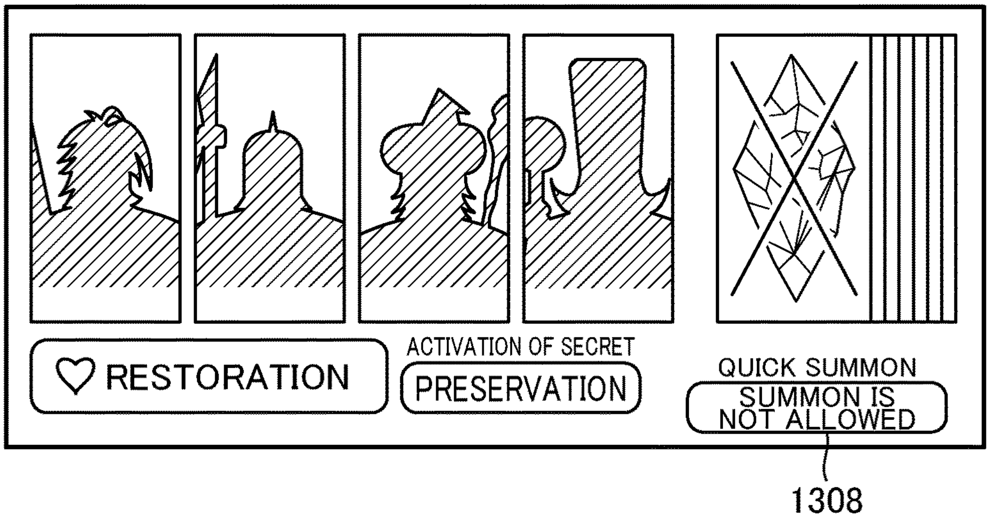
FIG. 13 shows an example of a game screen according to the embodiment of the present invention.

Furthermore, it is also possible that the effect activation processing of a predetermined second-type game medium can be executed only once in one battle. In the case where the effect activation processing of a game medium that has been set as a quick-execution game medium is executed, after the effect activation processing is executed once, an operation with respect to the quick-execution operation section is disabled, and a message "summon is not allowed" is displayed, as shown in a quick-execution operation section 1208 in FIG. 12, thus making it possible to indicate that the effect activation processing cannot be executed again.

In this embodiment, it is assumed that the player character identified by the RCID1 is a main character, and, in the case where the HP of the main character becomes zero, whereby the main character becomes unable to fight, the effect activation processing of the second-type game media is all unable to be executed. In the case where the main character becomes unable to fight, an operation with respect to the quick-execution operation section is disabled, and a massage "summon is not allowed" is displayed, as shown in the quick-execution operation section 1308 in FIG. 12, thus making it possible to indicate that the effect activation processing cannot be executed.

By using this embodiment, since a quick-execution game medium is set in each game-medium set, even in the case where a plurality of game-medium sets are organized, and the game-medium set to be used changes for each battle, the effect activation processing associated with the quick-execution game medium can be executed.

Furthermore, by using the quick-execution operation section, it is possible to reduce the number of user operations required for executing the effect activation processing, which is advantageous to the player, to reduce the complexity of player operations, and to reduce the time required for the battle. Furthermore, since an effect advantageous to the player can be executed with a smaller number of operations, it is possible to prompt execution of the effect activation processing associated with the quick-execution game medium, to proceed with the battle in an advantageous state due to the activated effect, and to reduce the time required for the battle. Accordingly, it is possible to enhance a player's sense of immersion into the game and to increase the number of active players.

In the above-described embodiment, a description has been given of an example case in which the user is allowed to play a game by using the browser program at the player device 10, it is also possible that the game program is stored in the storage device 14 at the player device 10, and the game program is executed, thereby executing information processing for proceeding with a game. The game program includes a game program for executing a game and various kinds of data to be referred to when the game program is executed. The game program is launched in accordance with an operation of the user with respect to the player device 10, and is executed on an operating system (OS) implemented in advance in the player device 10. In this case, in the above-described embodiment, at least part of the function of the game control unit 44 of the server 20 can be included in the game control unit 34 of the player device 10.

Furthermore, in another embodiment, it is also possible that the functions of the game control unit 44 etc. of the server 20 are all executed by the player device 10, and the game can be executed only with one player device 10 without communication with the server 20. Furthermore, while communication with the server 20 is not performed, communication with another player device 10 may be performed to allow execution of a battle game with the other player.

The processing or operation described above can be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1: game system, 2: network, 10: player device, 11: processor, 12: display device, 13: input device, 14: storage device, 15: communication device, 16: bus, 20: server, 21: processor, 22: display device, 23: input device, 24: storage device, 25: communication device, 26: bus, 31: input unit, 32: display unit, 33: communication unit, 34: game control unit, 41: input unit, 42: display unit, 43: communication unit, 44: game control unit

The invention claimed is:

1. A non-transitory computer readable medium storing a program for a game for performing a battle by using a first game-medium set selected from among two or more game-medium sets, the first game-medium set being organized and stored before a start of the battle and comprising one or more game media selected from among a plurality of game media possessed by a user, wherein the program, when executed by a computer, is configured to perform a method comprising:

storing, at a time of organization of the first game-medium set and in response to accepting a selection input for selecting a quick-execution game medium from the first game-medium set, a selected game medium as the quick-execution game medium;

displaying a quick-execution operation section in a battle screen in response to the battle being started by using the first game-medium set; and executing effect activation processing associated with the quick-execution game medium in the first game-medium set in response to accepting a user operation with respect to the quick-execution operation section.

2. The non-transitory computer readable medium storing the program according to claim 1, wherein the method further comprises:

displaying a non-quick-execution operation section in the battle screen;

displaying an effect-activation game-medium selection screen for selecting any of the one or more game media included in the first game-medium set, in response to a user operation with respect to the non-quick-execution operation section being accepted; and executing, in response to a user operation for selecting any of the one or more game media being accepted in the effect-activation game-medium selection screen, effect activation processing associated with the quick-execution game medium.

3. The non-transitory computer readable medium storing the program according to claim 2, wherein a plurality of game-medium selection sections for selecting individual game media are displayed in the effect-activation game-medium selection screen, and, in a game-medium selection section for the quick-execution game medium, information indicating that a game medium associated with the game-medium selection section has been set as the quick-execution game medium is displayed.

4. The non-transitory computer readable medium storing the program according to claim 1, wherein the method further comprises:

displaying a basic operation section in the battle screen;

determining whether the quick-execution game medium has been set in the first game-medium set used in the battle; and displaying the quick-execution operation section instead of the basic operation section in response to determining that the quick-execution game medium has been set.

5. The non-transitory computer readable medium storing the program according to claim 1, wherein the plurality of game media include a first-type of game medium and a second-type of game medium;

wherein two or more pieces of skill activation processing are associated with the first-type of game medium, and one piece of effect activation processing is associated with the second-type of game medium;

wherein one or more game media of the first-type of game medium and two or more game media of the second-type of game medium are included in the first game-medium set; and wherein the quick-execution game medium is selected from among the second-type of game medium.

6. A method comprising:

storing, by a computer and at a time of organization of a first game-medium set and in response to accepting a selection input for selecting a quick-execution game medium from the first game-medium set, a selected game medium as the quick-execution game medium, wherein the first game-medium set is used to perform a battle in a game, and wherein the first game-medium set is selected from among two or more game-medium sets, the first game-medium set being organized and stored before a start of the battle and comprising one or more game media selected from among a plurality of game media possessed by a user;

displaying, by the computer, a quick-execution operation section in a battle screen in response to the battle being started by using the first game-medium set; and executing, by the computer, effect activation processing associated with the quick-execution game medium in the first game-medium set in response to accepting a user operation with respect to the quick-execution operation section.

7. An information processing device comprising:

a computer processor; and a memory connected to the computer processor, wherein the memory comprises a program configured to perform a method, when executed by the computer processor, comprising:

storing, at a time of organization of a first game-medium set and in response to accepting a selection input for selecting a quick-execution game medium from the first game-medium set, a selected game medium as the quick-execution game medium, wherein the first game-medium set is used to perform a battle in a game, and wherein the first game-medium set is selected from among two or more game-medium sets, the first game-medium set being organized and stored before a start of the battle and comprising one or more game media selected from among a plurality of game media possessed by a user:

displaying a quick-execution operation section in a battle screen in response to the battle being started by using the first game-medium set; and executing effect activation processing associated with the quick-execution game medium in the first game-medium set in response to accepting a user operation with respect to the quick-execution operation section.

* * * * *